US007573692B1

(12) United States Patent
Weeks et al.

(10) Patent No.: US 7,573,692 B1

(45) Date of Patent: Aug. 11, 2009

(54) PROTECTIVE DEVICE WITH IMPROVED SURGE PROTECTION

(75) Inventors: Richard Weeks, Little York, NY (US); Kent Morgan, Groton, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 518 days.

(21) Appl. No.: 11/274,818

(22) Filed: Nov. 15, 2005

Related U.S. Application Data

(63) Continuation-in-part of application No. 11/080,574, filed on Mar. 15, 2005, now abandoned.

(51) Int. Cl.
*H02H 3/22* (2006.01)
*H02H 3/00* (2006.01)

(52) U.S. Cl. ........................................ 361/111; 361/42

(58) Field of Classification Search .................. 361/42, 361/111

See application file for complete search history.

(56) References Cited

U.S. PATENT DOCUMENTS

| | | | | |
|---|---|---|---|---|
| 3,581,143 | A * | 5/1971 | Dornfeld | 313/325 |
| 5,933,063 | A * | 8/1999 | Keung et al. | 335/18 |
| 6,535,369 | B1 * | 3/2003 | Redding et al. | 361/111 |
| 6,646,839 | B2 * | 11/2003 | Chaudhry et al. | 361/44 |
| 6,671,150 | B2 | 12/2003 | Elms et al. | |
| 6,807,036 | B2 * | 10/2004 | Baldwin | 361/42 |
| 6,900,972 | B1 | 5/2005 | Chan et al. | |

* cited by examiner

*Primary Examiner*—Stephen W Jackson
*Assistant Examiner*—Scott Bauer
(74) *Attorney, Agent, or Firm*—Daniel P. Malley; Bond, Schoeneck & King, PLLC

(57) ABSTRACT

The present invention is directed to an electrical wiring protection device for use in an electric circuit. The device includes a plurality of line terminals configured to be coupled to the electric circuit, and a plurality of load terminals configured to be coupled to an electric load. A housing assembly includes a front cover, a separator, and a body member arranged to form an interior isolation volume within the housing assembly. The plurality of line terminals and the plurality of load terminals are accessible from an exterior portion of the housing assembly. A protection circuit is disposed in the housing assembly and coupled to the plurality of line terminals or the plurality of load terminals. The protection circuit is configured to respond to a predetermined condition in the electric circuit or the electrical wiring protection device. A voltage transient suppression circuit is coupled to the plurality of line terminals, the voltage transient suppression circuit including a spark gap structure substantially disposed within the interior isolation volume.

40 Claims, 7 Drawing Sheets

PROTECTIVE DEVICE WITH IMPROVED SURGE PROTECTION

CROSS-REFERENCE TO RELATED APPLICATIONS

This is a continuation-in-part of U.S. patent application Ser. No. 11/080,574 filed on Mar. 15, 2005 now abandoned, the content of which is relied upon and incorporated herein by reference in its entirety, and the benefit of priority under 35 U.S.C. §120 is hereby claimed.

BACKGROUND OF THE INVENTION

1. Field of the Invention

The present invention relates generally to electrical wiring devices, and particularly to protective wiring devices.

2. Technical Background

Electrical distribution systems as defined herein, are systems configured to provide power to structures such as residences, commercial buildings or other such facilities. Such systems typically include one or more breaker panels coupled to a source of AC power. A breaker panel distributes AC power to one or more branch electric circuits installed in the structure. The electric circuits may typically include one or more receptacle outlets and may further transmit AC power to one or more electrically powered devices, commonly referred to in the art as load circuits. Receptacle outlets provide power to user-accessible, or portable, loads. Loads of this type are connected to a power cord and plug. As everyone knows, user-accessible loads obtain power by inserting the plug into the receptacle outlet.

Certain types of fault conditions have been known to occur in various portions of the electrical distribution systems. System designers have responded to these fault conditions by employing electric circuit protection devices in strategic positions throughout the distribution system, such as in the breaker panel and in protective devices (having receptacle outlets) disposed in the various branches of the distribution system. Protective devices may also be installed in the electrical load itself.

Electrical wiring devices as well as protective wiring devices are typically disposed in an electrically non-conductive housing. The housing provides access to electrical terminals that are electrically insulated from each other. As those skilled in the art understand, line terminals are employed to couple the wiring device to an electrical power source. Load terminals are coupled to wiring that directs AC power to one or more electrical loads disposed in the branch circuit. Load terminals may also be referred to as "feed-through" terminals because the wires connected to these terminals may be coupled to a daisy-chained configuration of receptacles or switches. The load may ultimately be connected at the far end of this arrangement. The load terminals may also be connected to an electrically conductive path that is also connected to a set of receptacle contacts. The receptacle contacts are in communication with receptacle openings disposed on the face of the housing. This arrangement allows a user to insert an appliance plug into the receptacle opening to thereby energize the device. Those of ordinary skill in the pertinent art will understand that the term "load" refers to an appliance, a switch, or some other electrically powered device.

There are several types of electric circuit protection devices that may be used depending on device location and device function. For example, such devices include ground fault circuit interrupters (GFCIs), ground-fault equipment protectors (GFEPs), Transient voltage surge suppressors (TVSSs) and arc fault circuit interrupters (AFCIs). Some devices include both GFCIs and AFCIs. This list includes representative examples and is not meant to be exhaustive.

As their names suggest, arc fault circuit interrupters (AFCIs), ground-fault equipment protectors (GFEPs) and ground fault circuit interrupters (GFCIs) perform different functions. An arc fault typically manifests itself as a high frequency current signal. Accordingly, an AFCI may be configured to detect various high frequency signals and de-energize the electrical circuit in response thereto.

A ground fault occurs when a current carrying (hot) conductor creates an unintended current path to ground. A differential current is created between the hot/neutral conductors because some of the current flowing in the circuit is diverted into the unintended current path. The unintended current path represents an electrical shock hazard. Ground faults, as well as arc faults, may also result in fire or represent a fire hazard. A "grounded neutral" is another type of ground fault. This type of fault may occur when the load neutral terminal, or a conductor connected to the load neutral terminal, becomes grounded.

Transient voltage surge suppressors (TVSSs) are designed to protect the branch circuit from lightning storms and from switched loads that impart transient over-voltages on the electrical distribution system. Some devices include both a TVSS and some other type of protective device. When a device is installed, its line terminals are connected to an AC power source, such as a single phase 120 VAC AC power source. Transient voltages may propagate in both the electrical distribution system as well as the AC power source. The amplitudes of transient voltages are typically greater than the amplitude of the source voltage by at least an order of magnitude. Transient voltage pulses may be generated by any number of events. For example, transient voltages may be introduced into the distribution system by lightning. Transient voltages may also be generated when an inductive load is turned off, when a motor with noisy brushes is operated, or by other events.

Transient voltages are known to damage protective devices such that the device ceases to function as designed. This is sometimes referred to as an end of life condition. When an end of life condition occurs in a GFCI, end of life failure modes include failure of device circuitry, the relay solenoid that opens the GFCI interrupting contacts, and/or failure of the solenoid driving device, such as a silicon controlled rectifier (SCR).

In some failure modes, the aforementioned damage may result in the protective device permanently denying power to the protected portion of the electric circuit. In this case, the user must replace the protective device to restore power to the protected portion of the circuit. In other failure modes, the damage may result in the protective device still providing power to the load even though the device has become non-protective and the user is left unprotected after an end-of-life condition has occurred. In either case, the user is either inconvenienced by having to change out the device, or even worse, is left unprotected.

To protect the device against damaging transient voltages, most devices are equipped with surge protection components. However, surge protection components occupy a considerable volume within the device housing. One drawback to surge protection components relates to their size, making the overall size of the device relatively large. Of course, relatively large devices are more difficult to install in a wall box because of the available space constraints. Another problem is that surge protective components themselves are known to experience an end-of-life condition. If the surge protection component fails, the device is unprotected from transient voltage damage and the device may become a shock hazard.

In general, a spark gap is often used to protect sensitive electrical or electronic equipment from high voltage surges. A spark gap typically consists of two conductive elements separated by a gas, which is usually air. During an abnormal voltage surge, the spark gap is designed to break down and safely shunt the voltage surge to ground to thereby protect the circuit from damage. The temperature of the arc occurring in the spark gap during a transient voltage condition can be greater than 1000° C. The spark gap may fail under such conditions.

Spark gap failure may occur when a component is overheated because of its composition and close proximity to the spark gap structure. The component may be a non-electrically conductive barrier made out of plastic, resin, fibrous material, or the like. Overheating may result in the barrier in becoming electrically conductive. The barrier may continue to be conductive even after the over-voltage condition has transpired. Overheating may also cause the barrier to deform to the extent that it is no longer able to provide electrical isolation. If the component is an electrically conductive component, such as a load current-carrying component, overheating may cause it to either melt or vaporize. This may result in the development of a new conductive path.

Another form of spark gap failure involves the plasma associated with the arc. The plasma may extend far enough to envelop a nearby conductor. Since the plasma is ionic, it may conduct current from the spark originating conductor to the aforementioned nearby conductor. The conducted electrical current may be enough to impair the operation of the protective device.

Spark gap failure may result in the protective device becoming susceptible to nuisance tripping. Like other failure modes, spark gap failure may cause the device to become non-protective. Even worse, this failure mode may result in a fire hazard or a shock hazard. Thus, non-conductive barriers and electrically conductive components must be disposed a sufficient distance from the spark gap. Heretofore this has not been possible because the size of the device enclosure is restricted by the size of the wall box. Unfortunately, components must be placed near the spark gap structure where they are vulnerable to the heat released during a transient voltage event. As an alternative, the components inside the enclosure must be arranged in an efficient and compact manner to overcome the size constraints.

Accordingly, a compact protective device having an improved space-conserving surge protection arrangement is needed. The aforementioned device must continue to provide reliable fault protection after the voltage transient event occurs. Further, a protective device is needed that is equipped to decouple the load terminals from the line terminals in the event of an end of life condition.

SUMMARY OF THE INVENTION

The present invention addresses the needs described above by providing a compact protective device that includes an improved space-conserving surge protection arrangement that continues to afford protection after the occurrence of a voltage transient event on the electrical distribution system. The compact protective device of the present invention is configured to reliably protect the user from a fault condition in the electrical power distribution system. Further, the protective device of the present invention is equipped to decouple the load terminals from the line terminals in the event of an end of life condition.

One aspect of the present invention is directed to an electrical wiring protection device for use in an electric circuit. The device includes a plurality of line terminals configured to be coupled to the electric circuit, and a plurality of load terminals configured to be coupled to an electric load. A housing assembly includes a front cover, a separator, and a body member arranged to form an interior isolation volume within the housing assembly. The plurality of line terminals and the plurality of load terminals are accessible from an exterior portion of the housing assembly. A protection circuit is disposed in the housing assembly and coupled to the plurality of line terminals or the plurality of load terminals. The protection circuit is configured to respond to a predetermined condition in the electric circuit or the electrical wiring protection device. A voltage transient suppression circuit is coupled to the plurality of line terminals, the voltage transient suppression circuit including a spark gap structure substantially disposed within the interior isolation volume.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
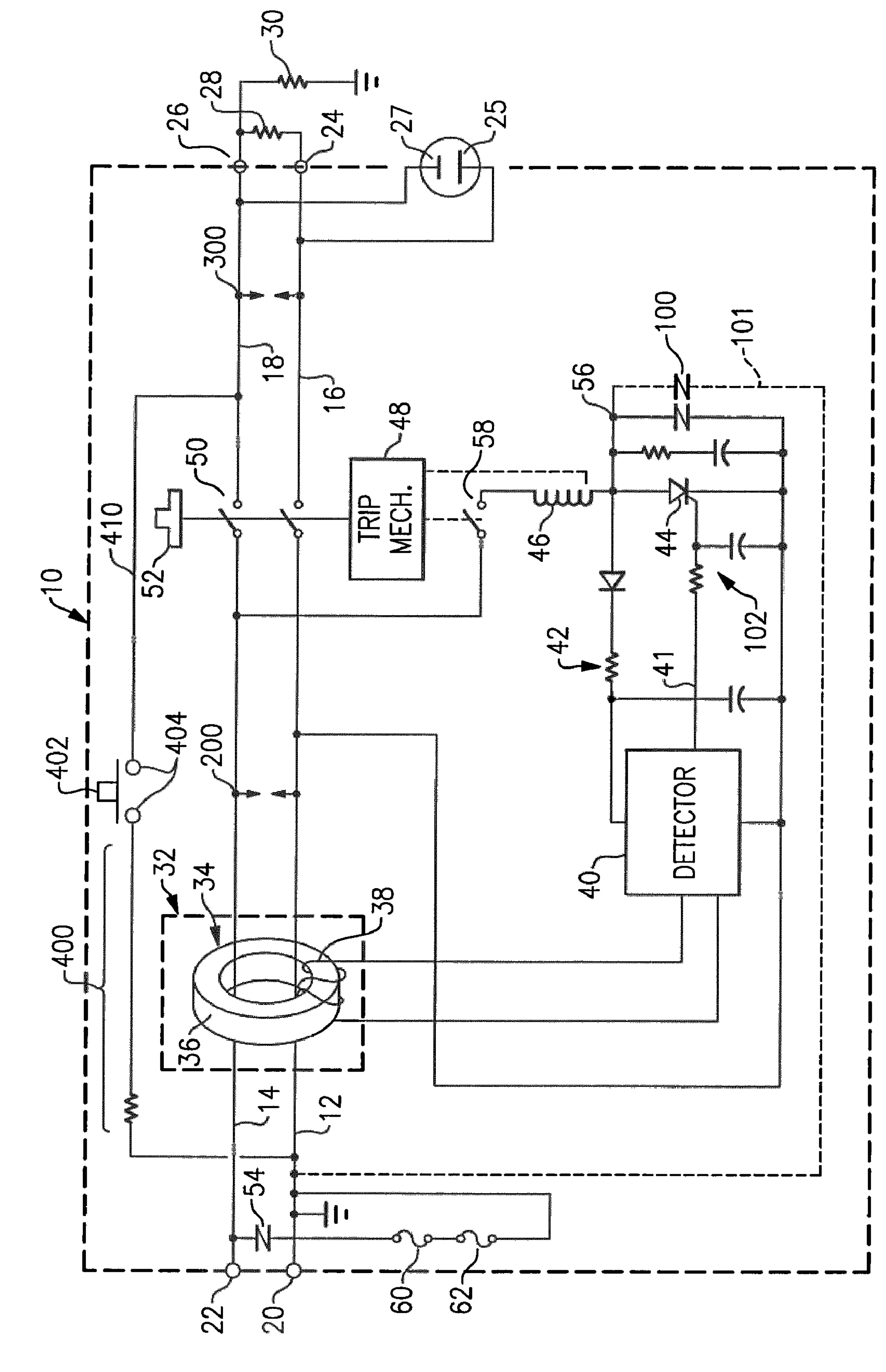
FIG. 1 is a block diagram of an electrical wiring device in accordance with a first embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the device of the present invention is shown in FIG. 1, and is designated generally throughout by reference numeral 10.

As embodied herein, and depicted in FIG. 1, a block diagram of an electrical wiring device 10 in accordance with a first embodiment of the present invention is disclosed. FIG. 1 is a general protection device in that detector 40 may be configured as a GFCI detector, a GFEP detector, an AFCI detector or a combination thereof. In other words, the teachings of the present invention are applicable to each type of protective wiring device.

The protective device 10 includes neutral line terminal 20 and hot line terminal 22 which are employed to connect device 10 to a source of AC power, which in a typical application is the branch circuit wiring connected to the breaker panel. On the other hand, the electrical distribution system may distribute power using single phase, split phase or multiple phase configurations by using two or more conductors. The embodiment of FIG. 1 is configured to accommodate single phase distribution. Device 10 also includes a neutral feed-through terminal 24 and a hot feed-through terminal 26. The load terminals (24, 26) provide connections to load 28. Device 10 also includes neutral receptacle terminal 25 and hot receptacle terminal 27. As those of ordinary skill in the art will understand, along with anyone who has ever used an electric appliance, receptacle terminals receive the blades of an attachment plug coupled to a cord, the plug and cord combination transmitting electric power to the appliance.

Line terminals 20, 22 are coupled to load terminals 24, 25, 26, 27 by the interruptible conductive path that includes neutral line conductor 12 and hot line conductor 14. Neutral line conductor 12 and hot line conductor 14 pass through sensor assembly 32 and terminate at circuit interrupter contacts 50. The interruptible conductive path also includes neutral load conductor 16 and hot load conductor 18, which are connected to load terminals 24, 26, respectively. Under normal operating conditions, i.e., no fault condition is extant, contacts 50 are closed and AC power is provided to load 28 in the reset state. When a fault is detected, contacts 50 are opened in the tripped state. A test circuit 400 is disposed between neutral line conductor 12 and hot load conductor 18.

A sensor assembly 32 input is coupled to neutral line conductor 12 and hot line conductor 14. The sensor assembly 32 output is directed into fault detector 40. A fault detector 40 output signal is provided to SCR 44. When a fault is detected, fault detector 40 causes SCR 44 to conduct and the trip solenoid 46 is energized in response thereto. In the normal chain of events, the energized trip solenoid 46 drives a plunger that activates trip mechanism 48 and the contacts 50 are opened. The device may be driven from the tripped state to the reset state by actuating reset button 52.

In one embodiment of the present invention, sensor assembly 32 and detector 40 are configured to detect ground faults. As such, sensor assembly 32 is configured to sense the differential current flowing through the conductors 12, 14. When device 10 is properly installed and the device is in the reset state operating under normal conditions, the differential current is zero because the currents to and from the load are equal in magnitude and opposite in polarity. However, when a ground fault is present, as represented by resistor 30 in FIG. 1, a hot conductor in load 28 becomes coupled to ground resulting in the generation of a differential current.

The differential current is generated because of the imbalance created by ground fault 30. In particular, while the current flowing through the hot conductor is sensed by sensor assembly 32, the return current does not flow through the neutral conductor because the fault condition directs the current to ground. Accordingly, the return current is not sensed by sensor assembly 32 and the differential current is non-zero.

Differential transformer 34 includes a toroidal core 36. Toroidal core 36 includes an aperture that accommodates line conductors 12, 14. A magnetic field is induced in core 36 by the non-zero current (differential current) flowing in conductors 12, 14. The magnetic flux induced in core 36 generates a signal in winding 38. The sensor output signal propagating on winding 38 is provided to detector 40.

It will be apparent to those of ordinary skill in the pertinent art that modifications and variations can be made to sensor assembly 32 of the present invention depending on the type of protection being afforded by device 10. For example, sensor assembly 32 may include current transformers, shunts, voltage dividers, and/or additional toroidal transformers. Such sensors are chosen to sense the fault condition(s) of interest.

Referring back to the sensor/detector interface, detector 40 determines whether the signal from sensor assembly 32 represents a fault condition. Detector 40 provides a fault signal on detector output line 41 if the differential current, as represented by the signal on winding 38, exceeds a predetermined amount. If a fault condition is detected, detector 40 provides a signal to solid state switch 44 to energize solenoid 46. Solenoid 46 in turn actuates trip mechanism 48 to open circuit interrupting contacts 50. Interrupting contacts 50 disconnect at least the hot load terminal 26 from the hot line terminal 22, but may also serve to disconnect the neutral load terminal 24 from neutral line terminal 20. Either way, device 10 is tripped.

Once device 10 trips, current stops flowing through the fault 30. With power to the fault removed, detector 40 can no longer provide a fault detect signal to solid state switch 44. Solid state switch 44 turns off and solenoid 46 is de-energized. The interval of time between the instant solenoid 44 energizes to trip the circuit interrupter, and the time it de-energizes after the fault condition is successfully eliminated, is typically less than 25 milliseconds. In the embodiment depicted in FIG. 1, solenoid 46 is implemented using a miniaturized construction because it does not have to be sized to withstand the heat that would be generated if the solenoid were continuously energized.

As previously noted, transient voltages are known to damage protective devices such that the device will cease to function as designed. Device 10 may be protected from high voltage transients by connecting a metal oxide varistor (MOV) 54 across the line and/or load terminals to clamp the transient voltage to a predetermined threshold. Of course, the predetermined voltage threshold is calculated such that device 10 survives the transient event. However, when employing this means for providing transient protection, MOV 54 must be relatively large in size to effectively clamp the transient voltage to an appropriate threshold. MOV 54 may be greater than 12 mm in diameter. As might be expected, a 12 mm MOV is usually relatively costly.

Accordingly, one transient protection feature of the present invention includes a MOV 56 in combination with an inductive component, such as solenoid 46. Voltage transients typically have an amplitude of 1 to 6 kV. Because they are relatively brief in duration, they have frequency components that may be greater than 100 kHz. On the other hand, the impedance of solenoid 46 is typically greater than 500 Ohms at a frequency of 100 kHz. Thus, the frequency dependence of the coil impedance may be used to safeguard MOV 56. Accordingly, MOV 56 may be downsized to take advantage of the frequency dependence of the coil impedance. In other words, MOV 56 may have a diameter that is less than or equal to 7 mm, while still managing to clamp the voltage at an appropriate threshold, because the solenoid impedance limits the amount of current through MOV 56. This approach may also provide cost benefits as well. A smaller MOV is relatively inexpensive when compared to a larger MOV. Further, the life expectancy of MOV 56 may be greatly increased by the impedance of solenoid 46 because it restricts the amount of current through the MOV for a given voltage transient magnitude. However, it is still possible for MOV 56 to experience an end-of-life condition.

A MOV may experience an end-of-life condition if it is subjected to a voltage transient having a magnitude that exceeds a predetermined level. An end-of-life condition may also occur if there is a large number of voltage transients. Environmental stresses may also play a part in causing a failure. Whatever the cause, at end-of-life, a MOV becomes increasingly conductive in nature. If the conductance of MOV 56 is less than about 0.01 Mhos, solenoid 46 is sufficiently coupled to the power source to actuate trip mechanism 48 to open interrupting contacts 50. The current flowing through MOV 56 would also flow through solenoid 46. The current, if uninterrupted, would cause solenoid 46 to burn out.

The present invention includes an auxiliary switch mechanism to avoid solenoid burn-out. An auxiliary switch 58 is disposed in series with solenoid 46. Auxiliary switch 58 is coupled to the trip mechanism 48, or alternatively, to the interrupting contacts 50 such that the contacts of auxiliary switch 58 open when the circuit interrupter is in the tripped condition. Device 10 may be reset by manually actuating reset button 52. This also results in the contacts of auxiliary switch 58 being closed. Upon reset, solenoid 46 is again coupled to the power source by way of the resistance of MOV 56, and again, trip mechanism 48 opens contacts 50 as well as the contacts of auxiliary switch 58. In sum, when MOV 56 has reached end-of-life, solenoid 46 is only momentarily energized. Solenoid 46 actuates the trip mechanism each time a reset action attempt is repeated. Even though MOV 56 has experienced an end-of-life condition, device 10 maintains its protective functionality. There is one caveat, however. If the end-of-life resistance of MOV 56 is greater than 100 Ohms, solenoid 46 may not be sufficiently coupled to the voltage source to trip the interrupting mechanism 48. If the interrupting mechanism does not trip, the current through solenoid 46 will not be interrupted by auxiliary switch 58. The uninterrupted current through solenoid 46 might cause the solenoid to burn out.

Referring to dashed line 101, in an alternate embodiment MOV 100 may be included to protect device 10 from a high voltage transients. Unlike MOV 56, MOV 100 prevents solenoid burn-out for all end-of-life resistance values. Note that MOV 100 is connected in series with solenoid 46. Thus, it is protected by the impedance of solenoid 46 in a similar manner to what has been described for MOV 56. However, because of the series combination of MOV 100 and solenoid 46, the current flowing through the series combination creates a differential current in the conductors passing through differential transformer 34. Detector 40 responds to the differential current and causes the device to trip in the manner previously described. The predetermined threshold for a GFCI is typically 6 mA, and for a GFEP or AFCI is typically 30 mA. Should the end-of-life resistance of MOV 100 generate a current greater than the detection threshold in detector 40, device 10 will trip and auxiliary switch 58 will open to protect solenoid 46 from burnout.

Of course, if the current flowing through the series combination of MOV 100 and solenoid 46 are less than the detection threshold, device 10 will not trip. However, solenoid 46 is configured to be able to withstand the continuous flow of current of this magnitude. By way of illustration, if MOV 100 has a resistance that is less than about 4,000 Ohms, a device having a 30 mA detection threshold will trip, because the current generated will be greater than the threshold. On the other hand, as MOV 100 becomes more resistive, i.e., the resistance becomes greater than about 4,000 Ohms, the current generated is less than the differential current threshold and device 10 will not trip. However, solenoid 46 is configured to withstand current that is less than the detection threshold. Accordingly, solenoid 46 will not burn out in either scenario because the voltage transient circuit is coupled to the fault detector and generates a differential current which in turn causes the protective device to trip. The protective device of the present invention is both safe and reliable in the face of an end-of-life condition.

Another feature of the present invention relates to preventing device 10 from being tripped by brief signals from sensor 32 that arise during voltage transient events. In particular, low pass filter 102 may be disposed between detector output 41 and SCR 44. Filter 102 is configured to filter out the momentary currents that flow through MOV 100 to prevent solid state switch 44 from responding to voltage transient events. As a result, trip mechanism 48 is not nuisance-actuated by these voltage transient events. In an alternative embodiment, low pass filter 102 may be implemented in detector 40 to avoid using discrete components.

When MOV 54 is experiencing increased conductivity at end-of-life, the current through the movistor may generate enough heat to cause it to open circuit or disconnect from the line terminals but not before the heat has already produced an electric shock or fire hazard. These hazards may also develop if the device is inadvertently connected to a continuous voltage that is greater than the rating of the movistor. This may occur if the device is connected to a source voltage greater than the intended voltage, for example, 240 VAC instead of 120 VAC. One approach for avoiding an end-of-life hazard is to connect the movistor to the line terminals in series with a thermal cut-off (TCO) 60. TCO 60 is configured to sense the heat generated by the movistor at the onset of the end-of-life condition. Heat from the movistor may be conducted to the TCO 60 through their leads or their enclosures. A thermally conductive material such as epoxy may be configured to help conduct heat from the movistor to the TCO 60. The TCO 60 and movistor may share the same enclosure. When TCO 60 reaches a predetermined temperature threshold, signifying an end-of-life condition is in progress, it open circuits. Accordingly, TCO 60 disconnects the movistor from the line terminals before the end-of-life condition is able to progress to a hazard.

In an alternative embodiment, MOV 54 is safeguarded by an air gap fuse 62, e.g. a glass fuse. MOV 54 is coupled to the line terminals in series with fuse 62. Fuse 62 is configured to remain closed during transient voltage conditions. This is because the transient event only lasts for about 100 US even though the fuse may conduct up to 3,000 Amperes during the transient. On the other hand, the fuse is configured to open when an end-of-life condition is in progress, when a current of at least 50 Amperes is flowing for about 1 second. Accordingly, the fuse disconnects the movistor from the line terminals before the end-of-life condition is able to progress to a hazard.

In yet another embodiment, a TCO 60 and an air gap fuse 62 are both disposed in series with MOV 54. The purpose of the TCO is to respond to the end of life condition. Unfortunately, the TCO may not disconnect the movistor from the line under all situations. The purpose of the air gap fuse is to provide the assured disconnection. Thus the TCO and air gap fuse are advantageous in combination.

In another embodiment, MOV 54 is physically disconnected from the circuit when it is starting to overheat due to an end-of-life condition. Ordinarily MOV 54 is secured to a printed circuit board by way of a thermally sensitive material. The thermally sensitive material may include a metal alloy such as solder, or an electrically conductive epoxy that serves to connect the movistor to conductive traces on a printed circuit board. In turn, the conductive traces serve to couple MOV 54 to the line terminals. The thermally sensitive material secures the movistor in place against the biasing force of a spring (not shown.) When MOV 54 attains at a sufficient temperature to melt (or burn) the thermally sensitive material, the movistor is no longer restrained in place. The spring moves the movistor out of electrical connectivity with the conductive traces. The electrical connectivity is broken before the end-of-life condition progresses to one of the aforementioned hazards.

Another feature of the present invention provides spark gaps (200, 300) for the absorption of the energy from the most severe transients. For example, voltage transients due to lightning have been known to produce 10 kV and/or 10 kA. The spark gaps are disposed in device 10 such that the surge current passing through the spark gap does not generate an output signal from sensor assembly 32. In other words, the spark gap(s) 200, 300 are configured such that the discharge current is not manifested as a differential current that may possibly be sensed by transformer 34. Spark gaps 200, 300 allow protective device 10 to remain in an operational condition in the presence of extremely severe voltage transients, or the currents that result from such voltage transients.

Figure 2:
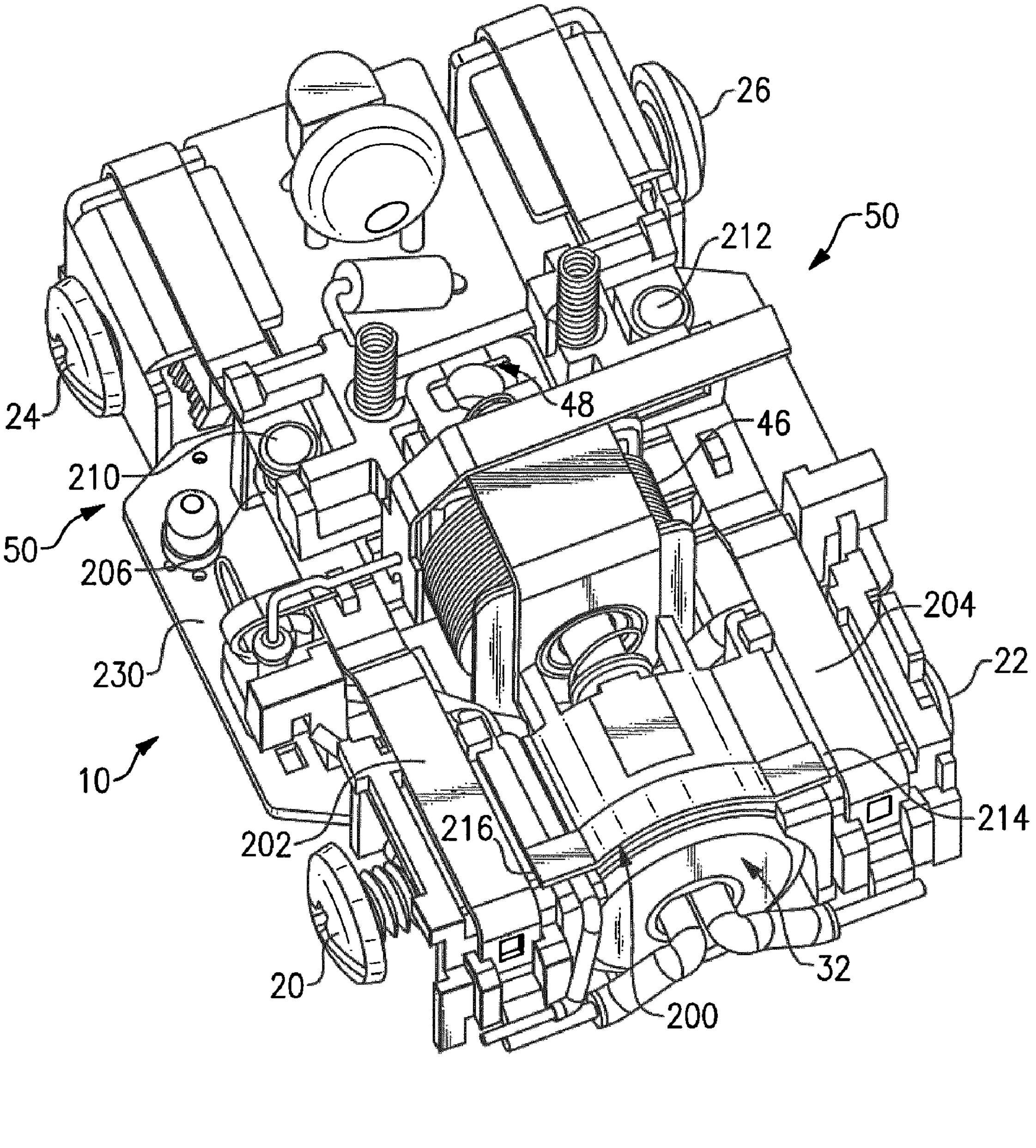
FIG. 2 is a perspective view of a line spark gap structure in accordance with one embodiment of the present invention.

As embodied herein and depicted in FIG. 2, a perspective view illustrating the mechanical components of device 10, including spark gap structure 200, is shown. The contact assembly 50 is implemented by movable contacts 206, 208 and fixed contacts 210, 212. Cantilever member 202 is connected to line neutral terminal 20 and cantilever member 204 is connected to line hot terminal 22. Movable contacts 206, 208 are disposed at the distal ends of cantilever beams 202, 204, respectively. Load terminals 24, 26 are electrically connected to fixed contacts 210, 212. Trip mechanism 48 is configured to move contact pairs (206, 210) and (208, 212) into electrical connection when device 10 is reset and to move them out of electrical connection when device 10 is tripped. The present invention contemplates using any type of suitable structure to implement interrupting contacts 50. Reference is made to U.S. patent application Ser. No. 10/900,769, filed Jul. 28, 2004, which is incorporated herein by reference as though fully set forth in its entirety, for a more detailed explanation of the various types of circuit interrupting structures that may be employed to implement the present invention.

Spark gap structure 200 is an electrically conductive member disposed between cantilever beams 202, 204. An air gap 214 is disposed between cantilever 204 and one end of spark gap structure 200. Another air gap 216 is disposed between cantilever 202 and the other end of the spark gap structure 200. The sum of the width of air gaps 214 and air gap 216 is typically between 0.030 and 0.060 inches. Of course, spark gap structure 200 may be implemented such that the two gaps are equal or unequal. In another embodiment, one of the air gaps may be eliminated. In yet another embodiment, an insulating material bridging the gaps may be included therein. The length of the insulating material is approximately 0.250 inches in length. Referring back to FIG. 1, a second air gap structure 300 may be disposed between the load conductors 16, 18.

Figure 3:
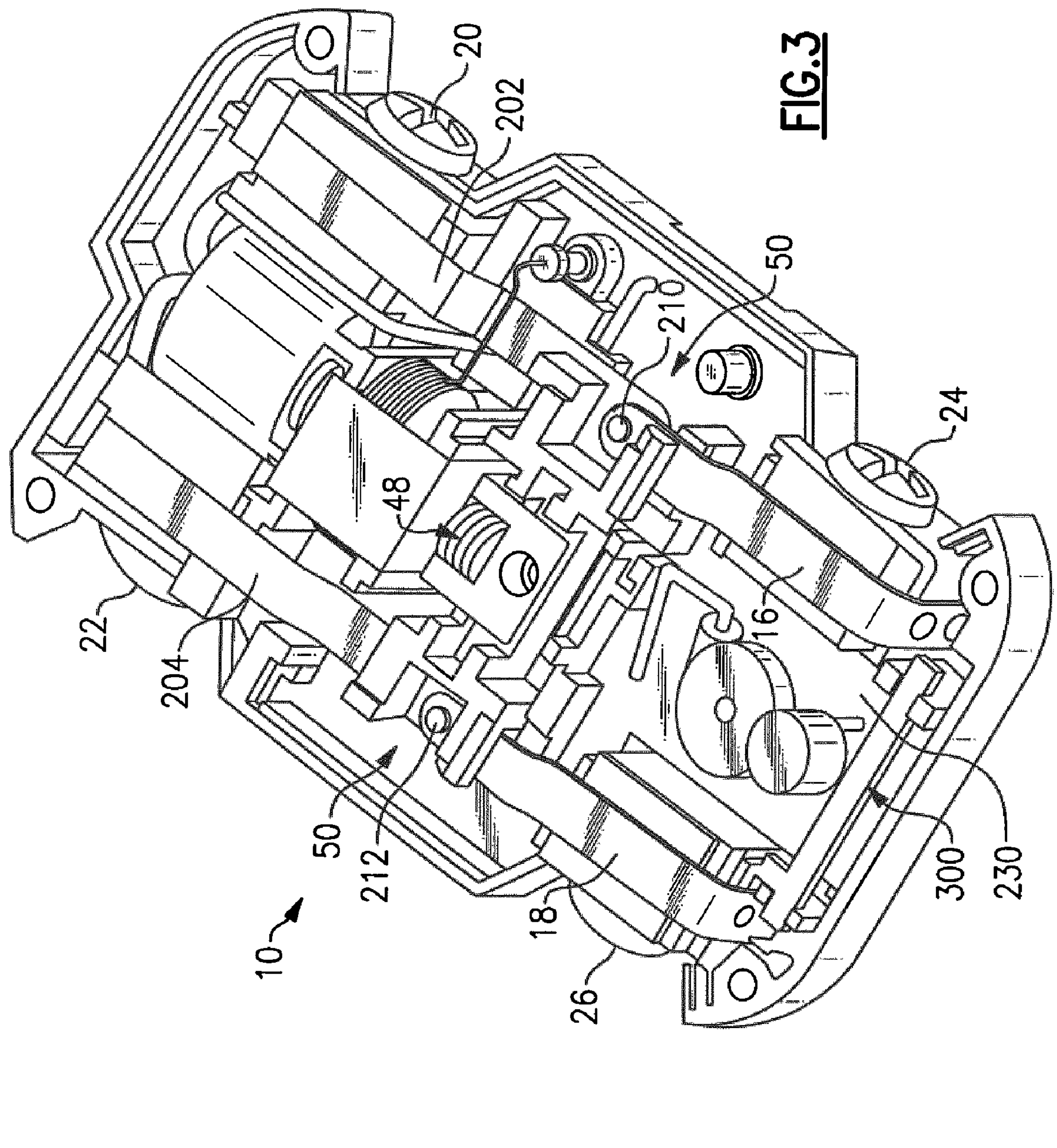
FIG. 3 is a perspective view of a load spark gap structure in accordance with another embodiment of the present invention.

FIG. 3 is a perspective view of a partially assembled device 10 that shows the load spark gap structure 300. Spark gap structure 300 is disposed between the conductors (16, 18) that connect the load terminals (24, 26) to fixed contacts (210, 212). Spark gap structure 300 is also configured to absorb the energy generated by a severe voltage transient event.

In an alternate embodiment, a MOV 54 and a spark gap structure are disposed in parallel across the line or load terminals. Ordinarily, the MOV 54 affords protection from transient voltage conditions. Since MOV 54 is clamping the voltage across the spark gap during a transient voltage event, the spark gap is ineffectual. As has been described, MOV 54 may experience an end-of-life condition. A method for disconnecting the movistor from the line terminals may be included so that end-of-life condition does not ultimately generate a hazardous condition. After MOV 54 has been disconnected from the circuit in response to an end-of-life condition, the spark gap structure takes over to afford protection of the device from transient voltage events.

Figure 4:
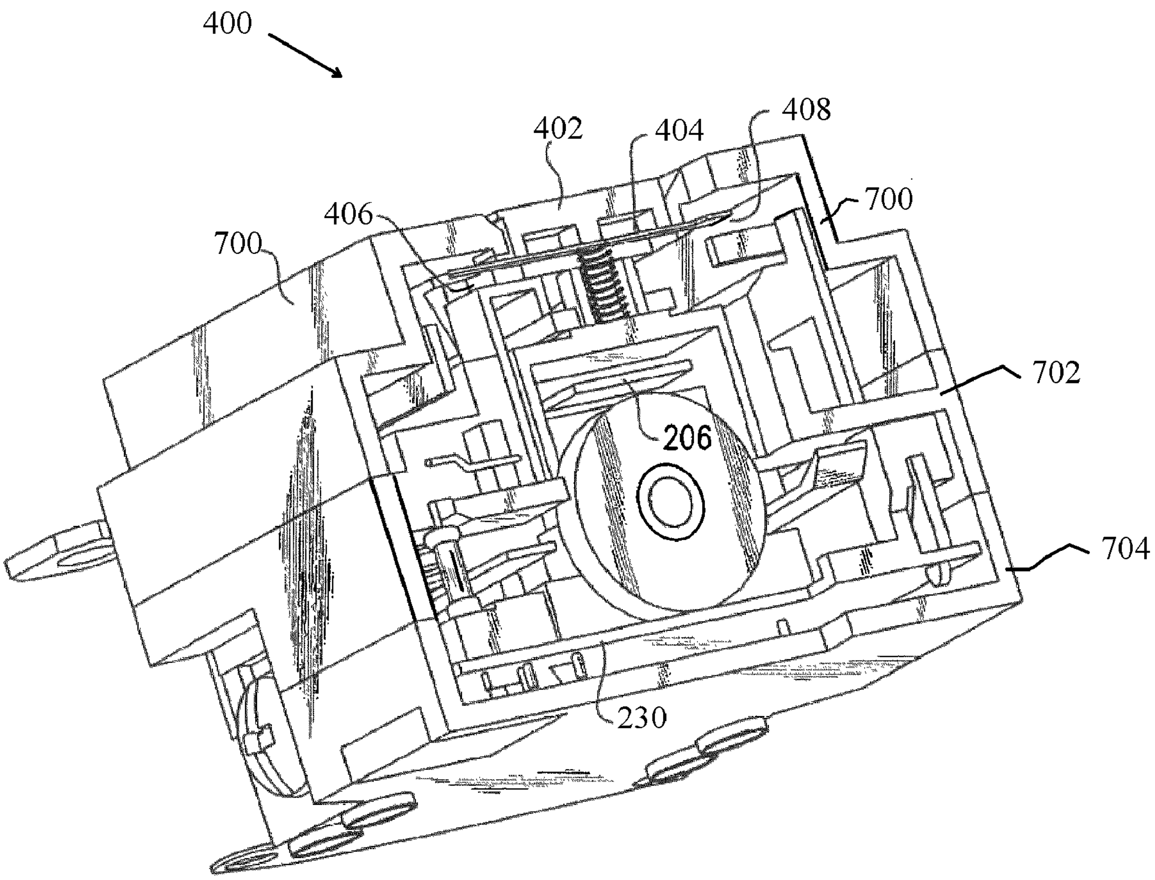
FIG. 4 is a sectional view of the device depicted in FIG. 1.

FIG. 4 is a partial sectional view of a device 10 that shows an electro-mechanical implementation of device 10. The combination of the front cover 700, separator 702 and the body member 704 illustrates the separation between the front portion of device 10 and the electronic components represented by sensor 34 and printed circuit board 230. Test button 402 and test contacts 404 (which are normally open) are positioned in or proximate to cover 700. These components are electrically coupled to the test circuit 400 which is at least partially disposed on PCB 230. Refer to FIG. 1 for a schematic representation of the test circuit 400.

Using the GFCI embodiment as an example, test circuit 400 couples the hot load terminal 26 to neutral line terminal 20 when test button 402 is depressed. The resulting current through test circuit 400 is sensed by differential transformer 34 in the same manner as a true ground fault condition. The gap between open contacts 404 is required to be greater than a predetermined spacing to prevent the test circuit 400 from becoming damaged during a voltage transient event. The predetermined gap is approximately 0.100 inches. However, any requirement that would necessitate test button 402 to travel 0.100 inches to close the gap would not be ergonomic. Accordingly, the gap between test button 402 and contacts 404 may be reduced by providing gap structures 406 and 408. Note that the MOVs (56, 100) and the air gap structures (200, 300) provide the test circuit 400 with transient protection.

Of course, a spark gap could be disposed elsewhere in the device housing to avoid damage to the toroid assembly. However, other components would then come into harm's way. The spark gap structure 200 (FIG. 2) rests against, or is in close proximity to, toroid assembly 32 such that any arc occurring during a transient voltage event may overheat an insulated portion of the toroid assembly. The overheating may damage the toroid assembly to the extent that the toroid assembly is no longer operative. The insulated portion of the toroid housing may become conductive, resulting in a hazardous thermal run-away condition due to current flowing through the surface if it is coupled to the line conductors.

In another embodiment, test circuit 400 may also be configured to provide automatic testing of device 10. Reference is made to U.S. Pat. No. 6,674,289 and U.S. Pat. No. 6,873,158 which are incorporated herein by reference as though fully set forth in its entirety, for a more detailed explanation of the automatic test circuit 400.

Figure 5:
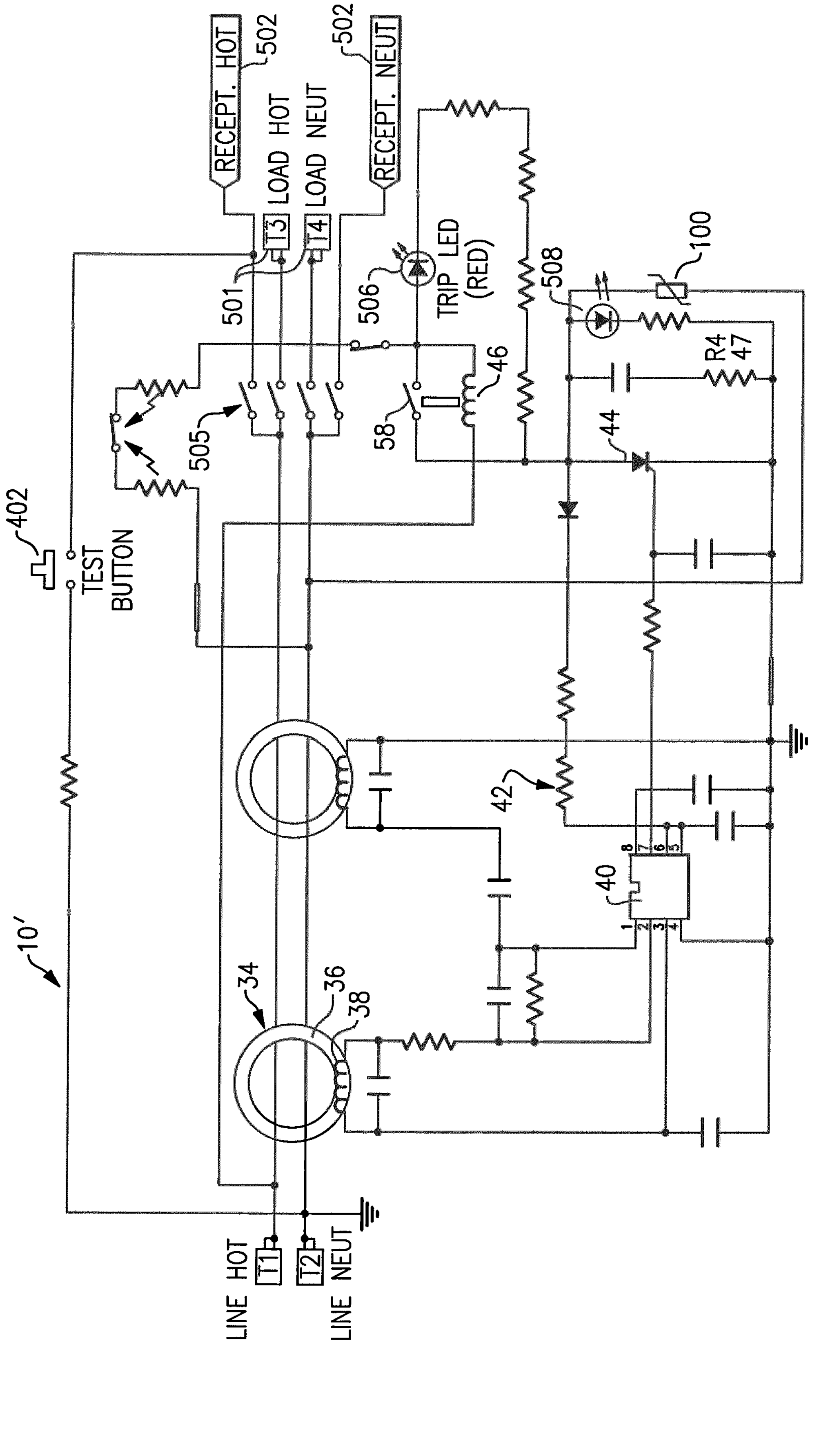
FIG. 5 is a circuit diagram of a GFCI embodiment in accordance with the present invention.

As embodied herein and depicted in FIG. 5, a circuit diagram of a GFCI embodiment 10' is shown. Device 10' includes feed-through terminals 501 configured to connect device 10' to the downstream wiring that provides power to downstream receptacles. Device 10' also includes receptacle load terminals 502 that are configured to accept a plug from a user attachable load. Interrupting contacts 505 are configured to disconnect the feed-through terminals 501 from the load terminals 502 when device 10' is in the tripped condition.

Device 10' includes indicators (506, 508) that are employed to alert the user to the reset or tripped status of device 10'. Indicator 506 is a trip indicator. It is coupled in parallel with auxiliary switch 58 and emits a signal when device 10' is connected to an AC power source and tripped. Indicator 508 is shown in FIG. 5 as a reset indicator. This indicator is shown as being coupled in series with auxiliary switch 58. Indicator 508 emits a signal when device 10' is connected to a source of power and the device 10' is reset. Indicator 506 and indicator 508 may be used in combination or separately. While LEDs are shown in FIG. 5, those of ordinary skill in the art will understand that the indicators may be implemented using visual indicators, audible indicators, or both. The indicators may be configured to emit a steady indication or, alternatively, may emit an intermittent indication such as visual flashing or audible beeping. As an aside, note that MOV 100 (or 56) limits the amplitude of the voltage transient that could otherwise create an end-of-life condition in the auxiliary switch 58, or in the indicators 506, 508.

Figure 6:
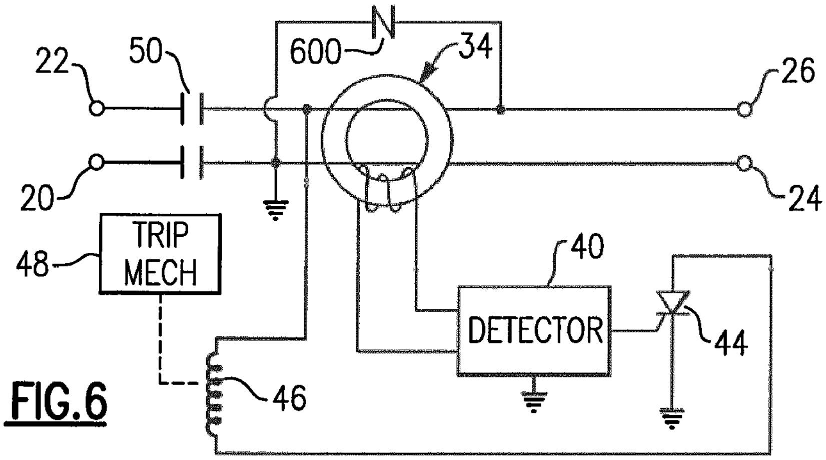
FIG. 6 is a partial schematic diagram of a protective device in accordance with another embodiment of the present invention.

Referring to FIG. 6, a partial schematic diagram of a device in accordance with another embodiment of the present invention is shown. In this embodiment, MOV 600 is connected across the load terminals 24, 26. MOV 600 is coupled to differential transformer 34 and configured to generate a differential current when an end-of-life condition occurs. In previous embodiments, sensor transformers were coupled to the line side of the device. In this embodiment, transformer 34 is coupled to the load side of device 10 but functions in the manner previously described, i.e., the differential current is sensed by transformer 34 and detected by detector 40. In turn, detector 40 provides a signal to solid state switch 44 to energize solenoid 46. Trip mechanism 48 is activated in response thereto, opening interrupting contacts 50. The significance of this arrangement is that an end-of-life condition in MOV 600 is interrupted before MOV 600 is able to overheat. The interruption of the current is accomplished by interrupting contacts 50. MOV 56 and MOV 100 may be coupled to the line terminals 20, 22 by way of solenoid 46 in the manner previously described.

Of course, those of ordinary skill in the art will understand that a protective device intended for installation in a wall box must be of an appropriate size to fit inside the wall box. As noted previously, there are two major constraints to this problem: the available space within the device housing is limited; and surge protective components are known to be relatively bulky. The problems may be addressed by positioning damage-prone components a minimum distance from the active region of the spark gap. This distance should be at least 0.250 inches. Referring back to the implementation of FIG. 2, spark gaps (200, 300) should be positioned at least 0.250 inches from the insulated surfaces of the toroid housing 32. Unfortunately, this spacing requirement results in an increase in the overall depth of device 10 as well. In a typical device, this increase would yield a GFCI having a 1.25 inch front-to-back depth dimension. On the other hand, the desired front-to-back depth is less than or equal to approximately an inch (1.00").

Figure 7:
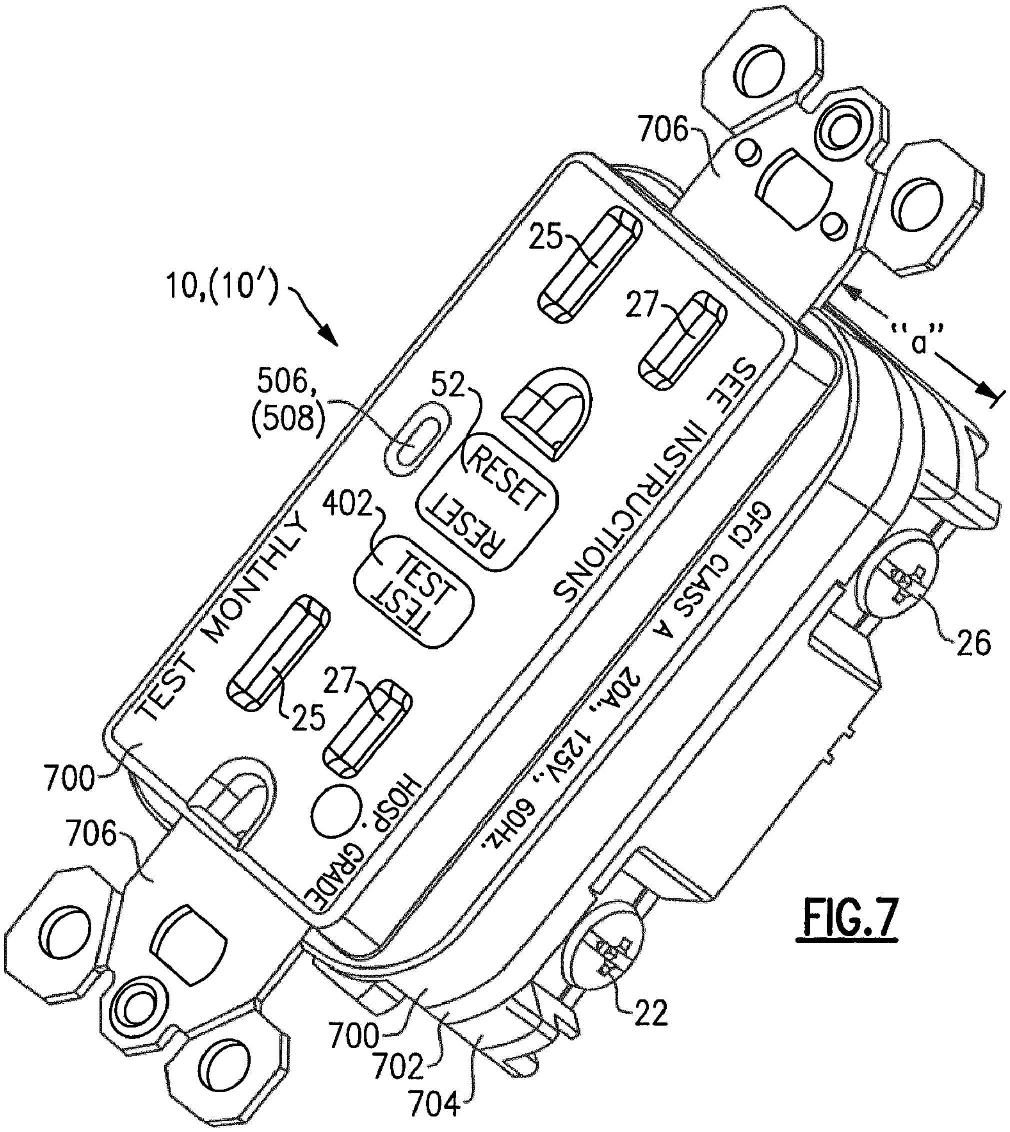
FIG. 7 is a perspective view of an electrical wiring device in accordance with the present invention.

Referring to FIG. 7, a perspective view of the front of protective device 10 (10') is shown. Device 10 (10') includes a front cover 700 and a body member 704. A component separator 702 is sandwiched between cover 700 body member 704. In an alternate embodiment, separator 702 may be entirely enclosed by cover 700 and body member 704. Line terminal 22 and load terminal 26 are electrically coupled, of course, to interior electrical components in accordance with the schematics (FIGS. 1, 5, 6). The line terminals (20, 22) and the feed-through load terminals (24, 26) are accessible to installers by way of the body member 704. Receptacle terminals (25, 27) are disposed in front cover 700. As those of ordinary skill in the art will appreciate, the cover 700, separator 702, and body member 704 are formed from an electrically non-conductive material. Device 10 (10') also includes mounting ears 706 that restrict the insertion depth of the device into the outlet box by a distance represented by dimension 'a.' Dimension 'a' is the distance between the back side of mounting ears 706 and the major rear surface of body member 704. The major rearward surface may be interrupted by protuberances associated with labels, terminals, relief pockets for internal components, and the like. As has been stated, it is desirable that dimension 'a' be substantially equal to, or less than, about one (1.00) inch. The major rearward surface occupies at least 80% of the overall rear surface. In one embodiment, the mounting ears 706 are made from a non-conductive material. In an alternate embodiment, the mounting ears 706 are the exposed ends of an electrically conductive strap assembly connected to the grounding conductor of the electrical distribution system when the device 10 (10') is installed. The conductive strap is connected to the receptacle ground terminals that accommodate the ground prong of the user attachable plug.

Figure 8:
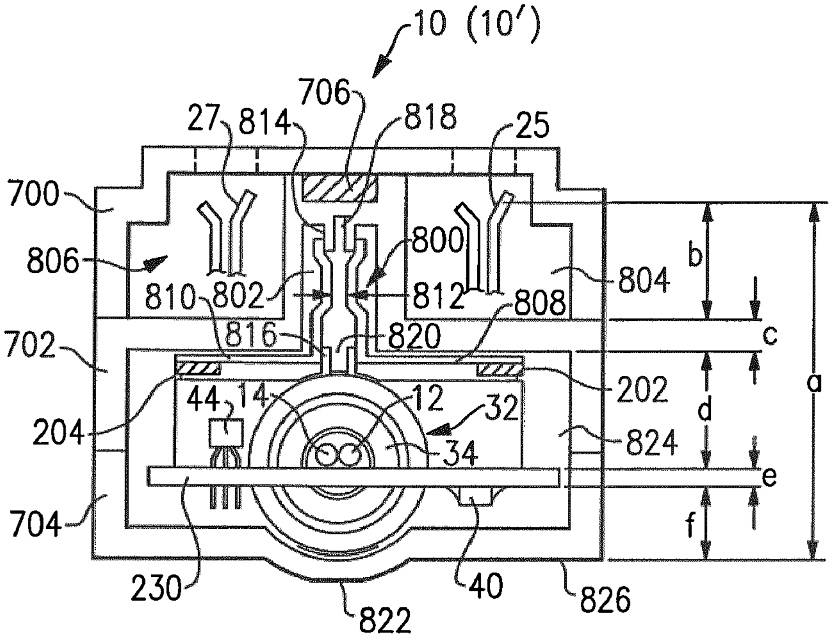
FIG. 8 is a cross-sectional view of a spark gap structure in accordance with an alternate embodiment of the present invention.

Referring to FIG. 8, a cross-sectional view of device 10 (10') illustrating an alternate spark gap structure embodiment is shown. The combination of the front cover 700, separator 702 and the body member 704 form separate isolated compartments (802, 804, 806, 824). Separator 702 serves to electrically isolate components in the circuit board compartment 824 from other components of device 10 (10') disposed between separator 702 and the front cover 700. The front cover 700 and the separator 702 form a top compartment that includes a plurality of pockets (802, 804, 806). Receptacle 25 is disposed in pocket 804 and receptacle 27 is disposed in pocket 806. The pockets (804, 806) serve to electrically isolate the receptacle contacts from the electrically conductive mounting strap 706 (not shown in FIG. 8), and from each other.

Spark gap structure 800 is disposed in a recessed pocket 802 formed in separator 702. The recessed pocket 802 is disposed at a location within device 10 that provides spatial isolation relative to the receptacle terminals (25, 27), reset button 52, and test button 402. Pocket 802 is approximately 0.25 inches deep and spans portions of cover 700 and separator 702. The spark gap structure 800 may be disposed along a central longitudinal axis of the device 10, (10') that extends from a mid point on a proximal mounting strap 22 to a mid point on the opposing distal mounting strap 22.

The spark gap pocket 802 confines the arc that occurs during a voltage transient to the interior volume of pocket 802 isolating arc-sensitive components of device 10 from the arc to prevent component damage in the pockets (804, 806) and the circuit board compartment 824. Pocket 802 prevents hot gasses or molten components from escaping from the device 10 (10'). Such emissions could lead to the ignition of nearby combustible materials through openings in the cover 700 and body 704. The openings, of course, are associated with the receptacle terminals, test button, and reset button. The terms pocket and compartment are used interchangeably herein.

Spark gap structure 800 includes electrically conductive members (808, 810) which are connected to cantilever beams (202,204). Conductive members (808, 810) are separated from each other by an air gap distance 812. In alternative embodiments, conductive members (808,810) are connected to line conductors (12,14), load conductors (16,18), or feed-through terminals (24,26). Conductive members may also be connected to the receptacle terminals (25,27.) Conductive members (808,810) may be electrically coupled to line conductors (12,14) by way of any suitable means including press-fitting, soldering, welding, braising, and etc. Since the electrical coupling need only be present during the transient surge event itself, the coupling may be effected by an air gap, with the proviso that the air gap is substantially less than air gap distance 812. Electrically conductive members (808,810) may be of a shape that allows them to be manufactured on a single fabrication tool.

The dimension of spark gap 812 must be in an approximate range between 0.030 to 0.050 inches to be effective. The spark gap dimension may be established by way of tabs 814 disposed in pocket 802 and/or tabs 816 disposed on the toroid assembly 32. Stated generally, the interior surfaces of pocket 802 may contact both electrically conductive members (808, 810) in order to separate them by the aforementioned distance. Of course, the interior surfaces are subject to being thermally stressed by voltage transient events.

Notch 818 is formed in the pocket 802 portion of separator 702 as a means for withstanding the aforementioned thermal stresses. Notch 820 in tab member 816 performs a similar function in the vicinity of toroid assembly 32. The notches (818, 820) are not significantly damaged by a transient voltage because the irregularly shaped surfaces created by the pocket/notch combination force the potentially damaging emissions to propagate over a large surface area preventing an electrical path between the conductive members from forming.

FIG. 8 provides key dimensions for device 10 (10'). As previously noted, the distance (a) between mounting ears 706 and the major rearward surface of back cover 704 should be less than or equal to approximately one (1.00) inch. Note that the major rear surface 826 may be interrupted by protrusions, such as coil assembly pocket 822. The dimension (b) between the blade insertion point and separator 702 allows plug blades to be completely inserted into the receptacle terminals (25, 27). To accommodate the typical plug blade, dimension (b) is approximately 0.37 inches. Dimension (c) represents the thickness of the wall of separator 702 and is about 0.07 inches. Dimension (d) represents the space required for electrical components mounted on the top-side of circuit board 230, such as SCR 44 and toroid assembly 32. The circuit board thickness (e) is approximately 0.03 inches. The electrical components may include surface mount device (SMD) components. Dimension (f) represents the space for SMD components coupled to the under-side of printed circuit board 230 in addition to the wall thickness of back cover 706 and is approximately 0.15 inches. In the example depicted in FIG. 8, dimension (a), the sum of dimensions (b-f), is approximately 0.98 inches.

The circuit board compartment 824 accommodates printed circuit board (PCB) 230. PCB 230 is employed to efficiently inter-connect the plurality of components comprising the protective device 10. The toroid assembly 32, solenoid assembly 46, MOV 56, indicator 506, indicator 508, and SCR 44 may be disposed on the top-side of PCB 230. SMD components may be disposed on either side of PCB 230.

Figure 9:
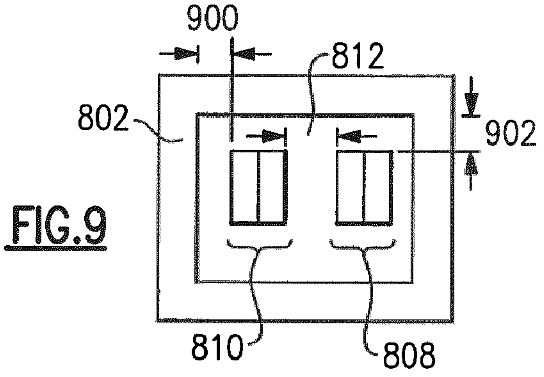
FIG. 9 is a top view of a spark gap structure in accordance with the alternate embodiment shown in FIG. 8.

Referring to FIG. 9, a top view of the spark gap pocket 802 is shown. Electrically conductive members (808, 810) are shown as being spatially separated from the interior surfaces of pocket 802 by spaces (900, 902). The spaces (900, 902) isolate the electrically conductive members (808, 810) from the interior surfaces of pocket 802; these interior surfaces would otherwise be subject to damage from the arc blast because of their proximity to the spark gap.

Figure 10:
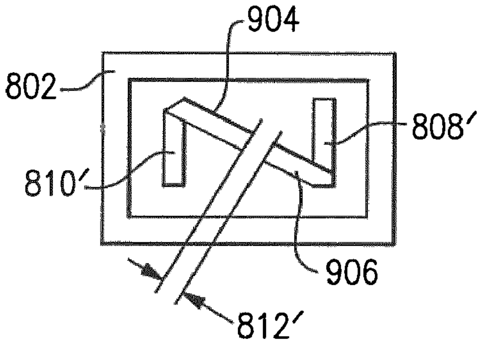
FIG. 10 is a top view of a spark gap structure in accordance with yet another alternate embodiment of the present invention.

Referring to FIG. 10, an alternate spark gap structure is shown. This structure is similar to the embodiment described in FIG. 9 except that electrically conductive members (808', 810') include spark gap electrodes (904, 906) separated by spark gap 812'. The electrodes in the vicinity of the spark gap may be contoured into any number of flatted or pointed surfaces.

In an alternate embodiment of the present invention, pocket 802 may be omitted. Separator 702 includes an aperture that accommodate the electrically conductive members (808, 810). The spark gap structure 800 is disposed substantially in the receptacle compartment formed between the cover 700 and the separator 702. Spark gap structure 800 is sufficiently isolated from device components such that any damage due to arc blast is substantially avoided.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An electrical wiring protection device for use in an electric circuit, the device comprising:

a plurality of line terminals configured to be coupled to the electric circuit and a plurality of load terminals configured to be coupled to an electric load;

a housing assembly including a front cover, a separator, and a body member, a portion of the separator being arranged to form an interior isolation volume within the housing assembly, the plurality of line terminals and the plurality of load terminals being accessible from an exterior portion of the housing assembly;

a protection circuit disposed in the housing assembly and coupled to the plurality of line terminals or the plurality of load terminals, the protection circuit being configured to respond to a predetermined condition in the electric circuit or the electrical wiring protection device; and a voltage transient suppression circuit coupled to the plurality of line terminals, the voltage transient suppression circuit including a spark gap structure substantially disposed within the interior isolation volume, the spark gap structure includes a hot conductor element connected to a hot line conductor at a first hot conductor element end and a neutral conductor element connected to a neutral line conductor at a first neutral conductor element end, a second end of the hot conductor element and a second end of the neutral conductor element being disposed within the isolation volume and separated by a predetermined distance, the separator further including at least one tab member disposed between the second end of the hot conductor element and a second end of the neutral conductor element.

2. The device of claim 1, wherein the at least one tab member includes a first tab member and a second tab member having a notch disposed therebetween.

3. The device of claim 1, wherein the first end of the hot conductor element is substantially perpendicular to the second end of the hot conductor element such that the hot conductor element is L-shaped, and wherein the first end of the neutral conductor element is substantially perpendicular to the second end of the neutral conductor element such that the neutral conductor element is L-shaped.

4. The device of claim 3, wherein the interior isolation volume is formed in a portion of the separator, the separator including at least one second tab member disposed between a distal portion of the second end of the hot conductor element disposed within the isolation volume and a distal portion of the second end of the neutral conductor element disposed within the isolation volume, and wherein the separator includes at least one first tab member disposed between a proximal portion of the second end of the hot conductor element and a proximal portion of the second end of the neutral conductor element, the proximal portion of the second end of the hot conductor element being adjacent to the first end of the hot conductor element and the proximal portion of the second end of the neutral conductor element being adjacent to the first end of the neutral conductor element.

5. The device of claim 4, wherein the housing assembly includes a body compartment disposed between the separator and the body member, the at least one first tab member being partially disposed within the isolation volume and partially disposed within the body compartment.

6. The device of claim 4, wherein at least a portion of the protection circuit is disposed in the body compartment.

7. The device of claim 6, wherein the portion of the protection circuit disposed in the body compartment is disposed on a printed circuit board.

8. The device of claim 1, wherein the housing assembly further comprises:

at least one receptacle load terminal compartment disposed between the front cover and the separator; and a device component compartment disposed between the separator and the body member.

9. The device of claim 8, wherein the plurality of load terminals includes a hot receptacle load terminal and a neutral receptacle load terminal disposed in the at least one receptacle load terminal compartment.

10. The device of claim 9, wherein the at least one receptacle load terminal compartment includes a hot receptacle load terminal compartment arranged to accommodate the hot receptacle load terminal and a neutral receptacle load terminal compartment arranged to accommodate the neutral receptacle load terminal, and wherein the interior isolation volume is formed in a portion of the separator and disposed between the hot receptacle load terminal compartment and the neutral receptacle load terminal compartment.

11. The device of claim 9, wherein the separator includes an aperture formed therein, the aperture forming a passageway between the at least one receptacle load terminal compartment and the device component compartment, the spark gap structure extending through the aperture and including a hot conductor element connected to a hot line conductor having a first end disposed in the device component compartment and a neutral conductor element connected to a neutral line conductor having a first end disposed in the device component compartment, the hot conductor element including a second end disposed in the isolation volume and the neutral conductor element including a second end disposed in the isolation volume, the isolation volume being disposed in the at least one receptacle load terminal compartment and separated from the hot receptacle load terminal and the neutral receptacle load terminal by a predetermined distance.

12. The device of claim 1, further comprising a circuit interrupter disposed between the plurality of line terminals and the plurality of load terminals, the circuit interrupter being responsive to the protection circuit such that the plurality of line terminals are coupled to the plurality of load terminals in a reset state and the plurality of line terminals are decoupled from the plurality of load terminals in a tripped state.

13. The device of claim 12, wherein the plurality of load terminals includes a plurality of feed-through terminals and a plurality of receptacle load terminals.

14. The device of claim 13, wherein at least one of the plurality of feed-through terminals is decoupled from at least one of the plurality of receptacle load terminals in the tripped state.

15. The device of claim 1, wherein the housing assembly further comprises a mounting flange disposed between the front cover and the body member, a distance from the mounting flange to a major rear surface of the body member being approximately less than or equal to one inch.

16. The device of claim 15, wherein the mounting flange is coupled to a device ground conductor.

17. The device of claim 1, wherein the predetermined condition includes an over-voltage condition, a ground fault condition, an arc fault condition, and/or a test condition.

18. The device of claim 1, wherein the electrical wiring protection device is selected from a group of wiring devices that includes a TVSS, a GFCI, and/or an AFCI.

19. The device of claim 1, wherein the spark gap structure is coupled to the plurality of line terminals by at least one conductive element.

20. The device of claim 19, wherein the at least one conductive element includes a first conductor and a second conductor disposed a predetermined distance apart to form a spark gap.

21. The device of claim 20, further comprising a spacer element disposed between the first conductor and the second conductor.

22. The device of claim 1, wherein the voltage transient suppression circuit further comprises a surge suppressor configured to simulate the predetermined condition in the event that the surge suppressor is in a failure mode.

23. The device of claim 22, wherein the surge suppressor is decoupled from the plurality of line terminals in a tripped state.

24. The device of claim 22, wherein the surge suppressor includes a MOV.

25. The device of claim 22, wherein the surge suppressor includes a capacitor.

26. The device of claim 22, wherein the surge suppressor includes a coil.

27. The device of claim 22, wherein the predetermined condition is a fault to ground condition.

28. The device of claim 22, wherein the surge suppressor includes a MOV in combination with another circuit element.

29. The device of claim 1, wherein the voltage transient suppression circuit further comprises a surge suppressor.

30. The device of claim 29, wherein the surge suppressor is decoupled from the plurality of line terminals in a tripped state.

31. The device of claim 29, wherein the surge suppressor is not decoupled from the plurality of line terminals in a tripped state.

32. The device of claim 31, wherein the surge is suppressor is urged out of electrical connectivity with the line terminals in response to an end-of-life condition.

33. The device of claim 31, wherein the surge suppressor is disconnected from the line terminals by a thermal fuse and/or air gap fuse in response to an end-of-life condition.

34. The device of claim 29, wherein the surge suppressor includes a MOV.

35. The device of claim 29, wherein the surge suppressor includes a capacitor.

36. The device of claim 29, wherein the surge suppressor includes a coil.

37. The device of claim 29, wherein the surge suppressor includes a MOV in combination with another circuit element.

38. The device of claim 29, wherein a thermal and/or air gap fuse is connected in series with the surge suppressor.

39. An electrical wiring protection device for use in an electric circuit, the device comprising:

a housing assembly including a front cover, a separator, and a body member arranged to form an interior isolation volume within the housing assembly, the housing assembly further including a hot receptacle load terminal compartment and a neutral receptacle load terminal compartment disposed between the front cover and the separator, and a device component compartment disposed between the separator and the body member, the interior isolation volume being formed in a portion of the separator and disposed between the hot receptacle load terminal compartment and the neutral receptacle load terminal compartment;

a plurality of line terminals configured to be coupled to the electric circuit and a plurality of load terminals, the plurality of load terminals including a hot receptacle load terminal disposed in the hot receptacle load terminal compartment and a neutral receptacle load terminal disposed in the neutral receptacle load terminal compartment, the plurality of line terminals and the plurality of load terminals being accessible from an exterior portion of the housing assembly;

a protection circuit disposed in the housing assembly and coupled to the plurality of line terminals or the plurality of load terminals, the protection circuit being configured to respond to a predetermined condition in the electric circuit or the electrical wiring protection device; and a voltage transient suppression circuit coupled to the plurality of line terminals, the voltage transient suppression circuit including a spark gap structure substantially disposed within the interior isolation volume.

40. An electrical wiring protection device for use in an electric circuit, the device comprising:

a housing assembly including a front cover, a separator, and a body member arranged to form an interior isolation volume within the housing assembly, the housing assembly further including at least one receptacle load terminal compartment disposed between the front cover and the separator, and a device component compartment disposed between the separator and the body member;

a plurality of line terminals configured to be coupled to the electric circuit and a plurality of load terminals, the plurality of load terminals including a hot receptacle load terminal and a neutral receptacle load terminal disposed in the at least one receptacle load terminal compartment, the plurality of line terminals and the plurality of load terminals being accessible from an exterior portion of the housing assembly;

a protection circuit disposed in the housing assembly and coupled to the plurality of line terminals or the plurality of load terminals, the protection circuit being configured to respond to a predetermined condition in the electric circuit or the electrical wiring protection device;

a voltage transient suppression circuit coupled to the plurality of line terminals, the voltage transient suppression circuit including a spark gap structure substantially disposed within the interior isolation volume; and an aperture formed in the separator, the aperture forming a passageway between the at least one receptacle load terminal compartment and the device component compartment, the spark gap structure extending through the aperture and including a hot conductor element connected to a hot line conductor having a first end disposed in the device component compartment and a neutral conductor element connected to a neutral line conductor having a first end disposed in the device component compartment, the hot conductor element including a second end disposed in the isolation volume and the neutral conductor element including a second end disposed in the isolation volume, the isolation volume being disposed in the at least one receptacle load terminal compartment and separated from the hot receptacle load terminal and the neutral receptacle load terminal by a predetermined distance.

* * * * *

UNITED STATES PATENT AND TRADEMARK OFFICE

CERTIFICATE OF CORRECTION

PATENT NO. : 7,573,692 B1
APPLICATION NO. : 11/274818
DATED : August 11, 2009
INVENTOR(S) : Weeks et al.

It is certified that error appears in the above-identified patent and that said Letters Patent is hereby corrected as shown below:

Column 16, claim 32, line 60, reads "the surge is supressor"

Please delete the word "is" such that column 16, claim 32, line 60 reads:

-- surge supressor --

Signed and Sealed this

Twentieth Day of October, 2009

David J. Kappos

David J. Kappos
*Director of the United States Patent and Trademark Office*